(12) United States Patent
Huang et al.

(10) Patent No.: US 11,168,012 B2
(45) Date of Patent: Nov. 9, 2021

(54) METHOD FOR REALIZING RAPID STARTUP OF DENITRIFICATION BIOFILTER

(71) Applicant: Nanjing University, Nanjing (CN)

(72) Inventors: Hui Huang, Nanjing (CN); Chong Peng, Yixing (CN); XuXiang Zhang, Nanjing (CN); HongQiang Ren, Nanjing (CN)

(*) Notice: Subject to any disclaimer, the term of this patent is extended or adjusted under 35 U.S.C. 154(b) by 34 days.

(21) Appl. No.: 16/352,841

(22) Filed: Mar. 14, 2019

(65) Prior Publication Data
US 2020/0231479 A1 Jul. 23, 2020

(30) Foreign Application Priority Data
Jan. 21, 2019 (CN) .......................... 201910052896.0

(51) Int. Cl.
C02F 3/34 (2006.01)
C02F 3/30 (2006.01)
C02F 3/28 (2006.01)
C02F 101/16 (2006.01)

(52) U.S. Cl.
CPC ............ C02F 3/305 (2013.01); C02F 3/2806 (2013.01); *C02F 2101/16* (2013.01)

(58) Field of Classification Search
None
See application file for complete search history.

(56) References Cited

U.S. PATENT DOCUMENTS 6,403,364 B1 * 6/2002 Hince ..................... B09C 1/10
  210/610
10,494,271 B2 * 12/2019 Wang ..................... C02F 1/281
(Continued)

FOREIGN PATENT DOCUMENTS

CN 101580297 A 11/2009
CN 103130325 A 6/2013

OTHER PUBLICATIONS

Liu et al., "Study of a combined heterotrophic and sulfur autotrophic denitrification technology for removal of nitrate in water," J. Haz. Materials, vol. 169, Issues 1-3, Sep. 30, 2009, pp. 23-28, https://doi.org/10.1016/j.jhazmat.2009.03.053, (Year: 2009).*

*Primary Examiner* — Chester T Barry
(74) *Attorney, Agent, or Firm* — W&K IP (57) ABSTRACT

A method for achieving rapid startup of a denitrification biofilter tank, which belongs to the technical field of biofilm sewage treatment. The specific steps are: 1. selecting heterotrophic denitrification or mixotrophic denitrification to treat influent sewage; 2. when the heterotrophic denitrification is used, pretreating the filter material with sodium carboxymethyl cellulose solution and then adding rhamnolipid after the introduction of sewage until the biofilter tank system starts successfully; 3. when the mixotrophic denitrification method is used, the filter tank is inoculated after the introduction of sewage, and the rhamnolipid is added thereto and is changed to sulfur source after operation for a while until startup is complete. The invention solves the problem that the denitrification biofilter tank in the sewage treatment is particularly slow in the mixotrophic state, and has a good application prospect.

7 Claims, 7 Drawing Sheets

(56) References Cited

U.S. PATENT DOCUMENTS

| | | | |
|---|---|---|---|
| 2013/0020257 A1* | 1/2013 | McCarty | C02F 3/302 210/614 |
| 2015/0353400 A1* | 12/2015 | Dube | C02F 1/286 210/665 |
| 2016/0122215 A1* | 5/2016 | Yuan | C02F 3/301 210/605 |
| 2017/0210654 A1* | 7/2017 | Yang | C02F 3/06 |
| 2018/0099887 A1* | 4/2018 | Huang | C02F 3/302 |
| 2018/0148681 A1* | 5/2018 | Gao | C12N 1/20 |
| 2018/0230033 A1* | 8/2018 | Cumbie | C02F 3/325 |
| 2020/0048673 A1* | 2/2020 | Ju | C12N 1/20 |
| 2020/0377398 A1* | 12/2020 | Lu | C02F 3/307 |

\* cited by examiner

METHOD FOR REALIZING RAPID STARTUP OF DENITRIFICATION BIOFILTER

CROSS-REFERENCE TO RELATED APPLICATIONS

This application claims priority to Chinese Patent Application No. 201910052896.0 with a filing date of Jan. 21, 2019. The content of the aforementioned applications, including any intervening amendments thereto, are incorporated herein by reference.

TECHNICAL FIELD

The present invention belongs to the technical field of sewage treatment through biofilm, and particularly relates to a method for realizing rapid startup of denitrification biofilter tank.

BACKGROUND OF THE INVENTION

With the continuous improvement of nitrogen emission requirements for sewage treatment, the deep removal of total nitrogen has gradually become one of the hot spots in this field. The traditional activated sludge process is difficult to meet the existing standards for sewage discharge, while the denitrification biofilter tank with both nitrogen removal and filtration functions has gradually become a hotspot in the upgrading of sewage treatment plants due to its characters such as simple operation, small area, low cost, and effective deep nitrogen removal, and with the development of technology, autotrophic denitrification (such as sulfur, iron and other autotrophic denitrification), mixotrophic denitrification (such as heterotrophic-sulfur autotrophic denitrification), etc., is gradually applied to the denitrification biofilter tank because its advantages such as the cost is lower than that of the mode of additive carbon source or can be used as ways to treat waste.

The denitrification biofilter tank is a sewage treatment technology using biofilm method. It quickly and effectively grows biofilm on the surface of the filter material and starts the denitrification biofilter tank to ensure the removal efficiency of contaminants. It is a key factor and restrictive step for the operation of denitrification biofilter tank. In general, the biofilm growing method of the denitrification biofilter tank in the startup phase comprises a suffocating method and a closed-loop method, etc. On the one hand, the existing startup method usually takes a long time, generally around 30-50 days, and the operation is generally complicated, such as Chinese invention patent "culture method of the biofilter tank and the water treatment method of the groundwater" (publication No. CN103130325A), wherein nutrients and trace elements are added in the backwash water and used as feed water to control the continuous operation of dissolved oxygen, while the startup time still needs 30-40 days; Chinese invention patent "a method for circulating in sludge and biofilm growing for biofilter tank" (publication No. CN101580297A) uses the biofilter tank mud-water mixture to circulate to form a certain water flow disturbance, strengthen the adhesion of microorganisms on the surface of the filter material to improve the efficiency of the biofilm growing, but the process is complicated and difficult to be applied in practice; on the other hand, there are few studies on accelerating the startup of mixotrophic denitrification biofilter tank, and it is difficult to provide effective reference for large-scale applications. In addition, recent studies have shown that rhamnolipids as a bio-metabolizing biosurfactant can be used as an additive carbon source and surface hydrophobic modifier to participate in the regulation of the adhesion and growth of microbial surface on the filter material surface in biofilm processes, which can effectively reduce the startup time of the filter biofilm growing, and can play a promoting role in the start of denitrification biofilter tank.

SUMMARY OF THE INVENTION

The present invention aims to solve the problem that the denitrification biofilter tank, especially the mixotrophic denitrification biofilter tank, is slow to start in the sewage treatment, and provides a method for realizing the rapid startup of the denitrification biofilter tank.

To achieve the above object, the technical solution provided by the present invention is as follows:

A method for achieving rapid startup of a denitrification biofilter tank comprises the following steps:

S1, selecting a denitrification method: for different types of sewage, heterotrophic denitrification or mixotrophic denitrification can be selected for treatment, and the corresponding startup method for the filter tank is determined according to the selected method;

S2. When the heterotrophic denitrification method is used to treat the sewage, conducting pretreatment to the filter material with sodium carboxymethyl cellulose (CMC) solution, and then filling into the filter tank, inoculating the activated sludge and then introducing sewage, and daily adding 50-200 mg/L rhamnolipid into the sewage;

S3. When the mixotrophic denitrification method is used to treat the sewage, first inoculating the activated sludge and introducing sewage, and daily adding 30-100 mg/L rhamnolipid into the sewage, and the addition is stopped after a period of continuous operation, calculating the amount of total nitrogen needed to be removed by autotrophic denitrification according to the total nitrogen in the effluent and effluent discharge standards after stopping the addition of rhamnolipid, and adding the sulfur source according to the ratio of different sulfur sources and total nitrogen required to be removed, growing the denitrifying microorganisms;

S4. Continuously operating the biofilter tank until the denitrification biofilter tank starts successfully.

The principle is that sodium carboxymethyl cellulose (CMC) is a macromolecular cellulose material and a layer of cellulose macromolecular is formed on the surface after the filter material is soaked in CMC solution, which is beneficial to the initial adhesion and growth of microorganisms. In addition, CMC can also provide carbon sources for microorganisms, accelerating the growth of microorganisms. As a biodegradable anionic surfactant, rhamnolipid can adjust the hydrophilicity of the surface of the filter material, change the force of the microorganisms and the surface of the filter material, and promote the deposition and adhesion of microorganisms on the surface of the filter material; Secondly, the rhamnolipid can be utilized and decomposed by microorganisms as raw materials for building their own substances, promoting the growth of microorganisms, enhancing the thickness and adhesion of biofilms, and improving the ability to withstand sewage shock loads. In the startup process of the mixotrophic denitrification filter, the general method is direct domestication. Since the autotrophic microorganisms grow slowly and the adhesion effect on the surface of the filter material is poor, it takes a long time to form a stable mixotrophic denitrification system. The present method firstly cultures a certain biomass rapidly and then starts to add a sulfur source, and then enriches the autotrophic microorganisms on the basis of forming a certain amount of biofilm on the surface of the filter material, which can effectively shorten the time for forming a stable autotrophic microbial population on the surface of the filter material compared with direct domestication such that the denitrification biofilter tank completes the startup earlier by 1-2 weeks, and the adhesion effect of the autotrophic microorganism on the surface of the filter material is enhanced, and the impact resistance to the sewage load is improved.

In the above scheme, the type of sewage in S1 is any one of municipal sewage, biochemical effluent of industrial sewage or micro-polluted surface water. The invention is applicable to the startup of heterotrophic denitrification and mixotrophic denitrification biofilter tank. The applicable sewage range is 8-25° C. and substantially covers a range of sewage temperatures suitable for treatment with denitrification biofilter tank.

In the above scheme, the specific method for pretreating the filter material by using the CMC solution in S2 is to place the filter material in a CMC solution having a mass concentration of 2% to 5%, stir for 2-5 minutes, remove it, and dry it naturally for use.

In the above scheme, the rhamnolipid in S2 and S3 is a mixture of mono-rhamnolipid and di-rhamnolipid, wherein the weight ratio of mono-rhamnolipid and double rhamnolipid is 1:1~1:2, the purity is industrial grade, and the concentration is 25%.

In the above scheme, the filter material pretreated in S2 is one selected from the group consisting of ceramsite, quartz sand, and volcanic rock filter material, and the selection of the filter material in S3 is the same to S2.

In the above scheme, the dosage of rhamnolipid in S2 is 50-200 mg/L, and the dosage is daily, and the dosage of rhamnolipid in S3 is 30-100 mg/L, and the dosage is daily.

In the above scheme, after adding the rhamnolipid in S4 for 12-18 days, the total nitrogen removal rate is over 60%, and the filter material is collected and examined by microscope, when there is obvious bacterial micelle structure, the addition of the rhamnolipid is stopped and changed to a sulfur source, wherein the sulfur source is any one of elemental sulfur, sodium sulfide or sodium thiosulfate, firstly the amount of total nitrogen needed to be removed by autotrophic denitrification according to the total nitrogen in the effluent and effluent discharge standards after stopping the addition of rhamnolipid is calculated, and then sulfur source is added, the amount of sulfur source is added according to the ratio of different sulfur sauces and the amount of total nitrogen needed to be removed: 3-5 kg of elemental sulfur/kg·TN, 5-6 kg of sodium sulfide/kg·TN, 8-10 kg of sodium thiosulfate/kg·TN, the dosage is added daily.

In the above scheme, the criteria for determining the completion of the startup of the heterotrophic denitrification biofilter tank in S4 is that in the completely heterotrophic state, the total nitrogen removal rate at normal temperature reaches above 80%, and the nitrogen removal rate at low temperature reaches above 70% and the effluent is stable, when the surface of the filter material forms a brown-yellow biofilm visible to the naked eye, it is considered as a successful startup of the denitrification biofilter tank, and the rhamnolipid can be stopped; in the mixotrophic state, the total nitrogen removal rate at normal temperature reaches above 75% and the total nitrogen removal rate at low temperature is over 70%, and the effluent is stable, when the surface of the filter material forms a yellowish biofilm visible to the naked eye, it is considered as a successful startup of the mixotrophic denitrification system, and the sewage can be introduced normally.

The present invention has the following significant advantages:

(1) The present invention proposes a simple and practical method for rapid startup of denitrification biofilter tank for heterotrophic denitrification and mixotrophic denitrification.

(2) The invention is directed to pretreat the filter material by sodium carboxymethyl cellulose solution, and add rhamnolipid to the influent wastewater to increase the adhesion rate and growth rate of the microorganism on the surface of the filter material, and the dry weight of biofilm on the surface of the filter material can be increased by 60%-115% when the startup is completed compared with the ordinary growing method, which greatly reduces the startup time of the heterotrophic denitrification biofilter tank and can improve the removal rate of total nitrogen by the filter tank.

(3) For a mixotrophic denitrification process, the present invention is directed to add a certain concentration of rhamnolipid to the influent water, rapidly forming a certain biomass, then domesticate the autotrophic microorganism, forming a mixotrophic denitrification system of the coexistence of heterotrophic denitrification microorganism and autotrophic denitrification microorganism, which can greatly shorten the startup time of the filter tank, and the dry weight of biofilm on the surface of the filter material can be increased by 40%-160% when the startup is completed compared with the ordinary growing method (4) The raw materials required for the present invention are relatively inexpensive and can be effectively and widely applied to denitrification biofilter tank.

DRAWINGS OF THE INVENTION

DETAILED DESCRIPTION OF THE INVENTION

To further understand the contents of the present invention, the present invention will be further described below in conjunction with the examples.

Example 1

This example relates to a method for rapidly starting the denitrification biofilter tank on the treatment of municipal sewage at a low temperature by using a heterotrophic denitrification method.

Sewage quality: COD concentration is 150-210 mg/L, TN concentration is 40-55 mg/L, pH is 7.4-7.6, ammonia nitrogen concentration is 0.6-1.8 mg/L, nitrite nitrogen concentration is 0.2-0.8 mg/L, sewage temperature is 8-10° C. The hydraulic retention time is 3 hours. The ceramsite is selected as the denitrification biofilter tank filter material and is operated in an upward flow mode. The heterotrophic denitrification treatment is selected, and the implementation process comprises the following steps:

S1, pretreatment of ceramsite filter material: the ceramsite is placed in a 3% CMC solution and stirred for 5 minutes, then removed, naturally dried and filled into a denitrification biofilter tank;

S2, continuous operation after inoculation: activated sludge taken from the anoxic tank sludge (MLSS concentration of 3800 mg/L) from the municipal sewage treatment plant is added to the denitrification biofilter tank to submerge the filter material, all the sludge was discharged after 24 hours of air exposure without sewage inlet then normal sewage treatment is started, and 150 mg/L of rhamnolipid is added daily in the influent water, and the operation is continued. Wherein the rhamnolipid is a mixture of a mono-rhamnolipid and a di-rhamnolipid in a weight ratio of 1:1.

Figure 1:
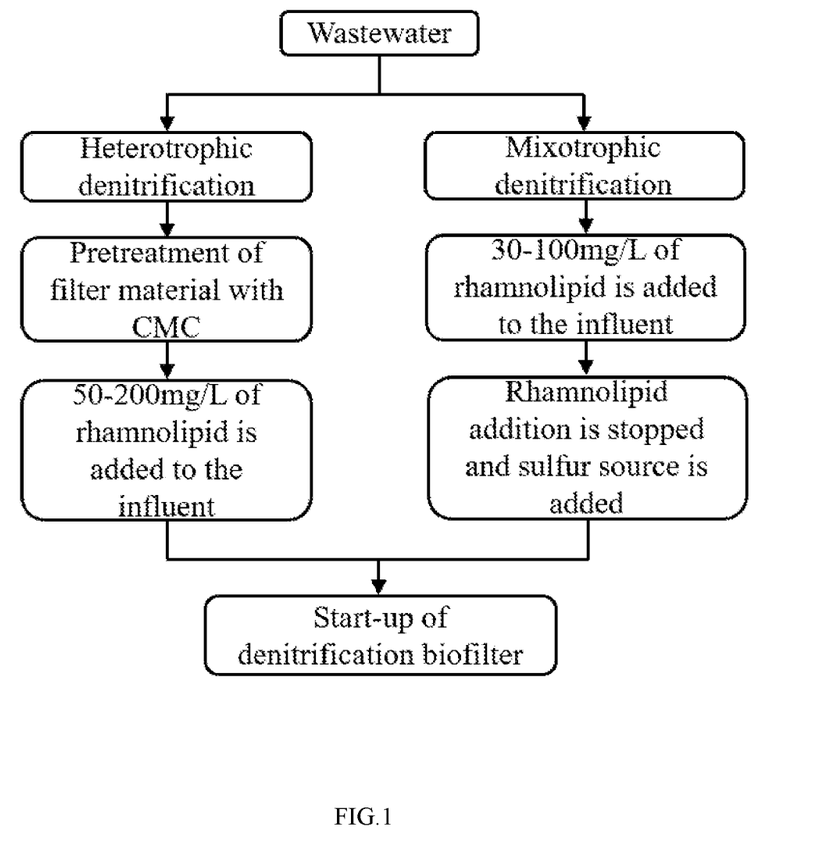
FIG. 1 is a block diagram of a process flow of the present invention.
Figure 2:
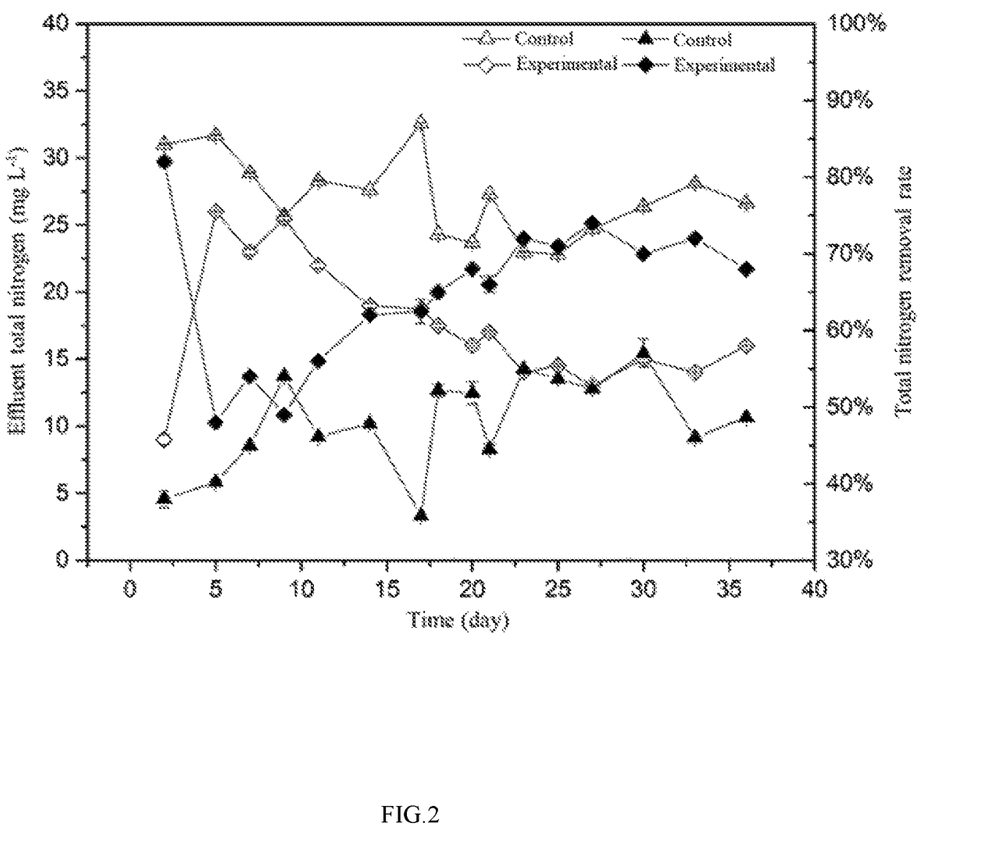
FIG. 2 is a diagram of the effect of the startup operation of the denitrification biofilter tank on the treatment of a municipal sewage at a low temperature by the present method for promoting heterotrophic denitrification.

The total nitrogen in the effluent during operation is shown in FIG. 2. When the biofilter tank starts to operate, the CMC attached to the surface of the filter material can provide a carbon source for biological denitrification, so the total nitrogen removal rate is higher, and then due to the consumption of CMC, the total nitrogen removal rate decreased, and the removal rate gradually increased and reached a steady state due to the growth of the biofilm. After 22 days of operation of the denitrification biofilter tank started by this method, the removal rate of COD and total nitrogen reached 84% and 72%, respectively, and the subsequent effluent was substantially stable. A brownish yellow biofilm appeared on the surface of the filter material. The filter material at the same position of the filter tank is collected to determine the dry weight of the surface biofilm. After treatment with this method, the surface biomass of the filter material per unit mass increases by about 75%. At this time, it is considered that the process for starting the denitrification biofilter tank is completed and addition of rhamnolipid stops. And sewage is introduced normally. After the treatment by the present method, the startup time is shortened by 10 days compared with the denitrification biofilter tank in which the present technical case is not implemented, and the average removal rate of effluent COD and total nitrogen increases by about 12% and 15%, respectively, which shows the present implementation can speed up the startup of the denitrification biofilter tank and increase the ability to remove contaminants.

Example 2

This example relates to a method for rapidly starting the denitrification biofilter tank on the treatment of biochemical effluent in the dye industrial sewage at a low temperature by using a heterotrophic denitrification method.

Sewage quality: COD concentration is 25-50 mg/L, TN concentration is 15-22 mg/L, pH is 7.1-7.3, ammonia nitrogen concentration is 0.5-0.9 mg/L, nitrite nitrogen concentration is 0.1-0.3 mg/L, sewage temperature is 22-25° C. The hydraulic retention time is set to 1.2 hours, and quartz sand is selected as the denitrification biofilter tank filter material and is operated in a downward flow mode. The heterotrophic denitrification treatment is selected, and the implementation process comprises the following steps:

S1, pretreatment of quartz sand filter material: the quartz sand filter material is placed in a 2% CMC solution and stirred for 5 minutes, then removed, naturally dried and filled into a denitrification biofilter tank;

S2, continuous operation after inoculation: activated sludge taken from the anoxic tank sludge (MLSS concentration of 4500 mg/L) from the municipal sewage treatment plant is added to the denitrification biofilter tank to submerge the filter material, all the sludge was discharged after 12 hours of air exposure without sewage inlet then normal sewage treatment is started, and 50 mg/L of rhamnolipid is added daily in the influent water, and the operation is continued. Wherein the rhamnolipid is a mixture of a mono-rhamnolipid and a di-rhamnolipid in a weight ratio of 1:1.2.

Figure 3:
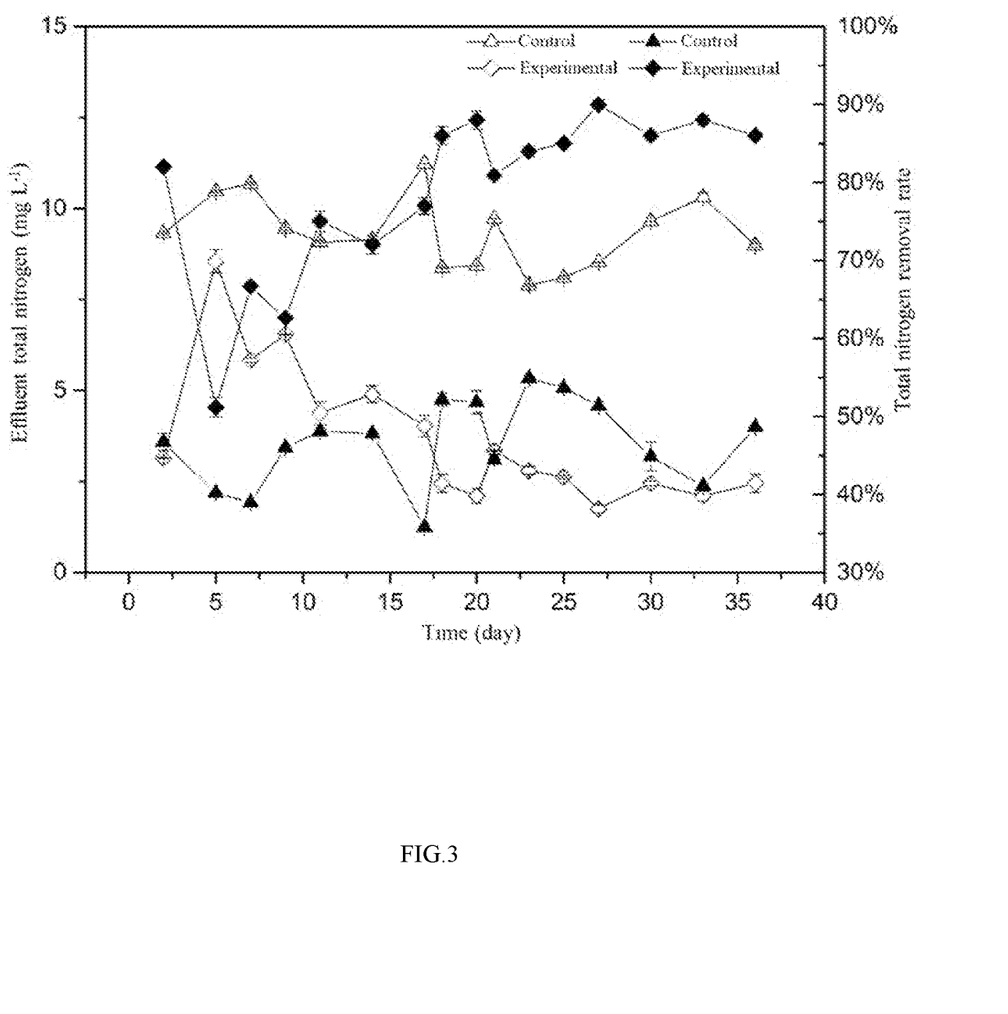
FIG. 3 is a diagram of the effect of the startup operation of the denitrification biofilter tank on the treatment of biochemical effluent of a dye industrial sewage at room temperature by the present method for promoting heterotrophic denitrification.

The total nitrogen in the effluent during operation is shown in FIG. 3, When the biofilter tank starts to operate, the CMC attached to the surface of the filter material can provide a carbon source for biological denitrification, so the total nitrogen removal rate is higher, and then due to the consumption of CMC, the total nitrogen removal rate decreased, and the removal rate gradually increased and reached a steady state due to the growth of the biofilm. After 22 days of operation of the denitrification biofilter tank started by this method, the removal rate of COD and total nitrogen 86% and 88%, respectively, and the subsequent effluent was substantially stable. A brownish yellow biofilm appeared on the surface of the filter material. The filter material at the same position of the filter tank is collected to determine the dry weight of the surface biofilm. After treatment with this method, the surface biomass of the filter material per unit mass increases by about 92%. At this time, it is considered that the process for starting the denitrification biofilter tank is completed and addition of rhamnolipid stops. And sewage is introduced normally. After the treatment by the present method, the startup time is shortened by 14 days compared with the denitrification biofilter tank in which the present technical case is not implemented, and the average removal rate of effluent COD and total nitrogen increases by about 8% and 38%, respectively, which shows the present implementation can speed up the startup of the denitrification biofilter tank and increase the ability to remove contaminants.

Example 3

This example relates to a method for rapidly starting the denitrification biofilter tank on the treatment of micro-polluted surface water at normal temperature by using a heterotrophic denitrification method.

Sewage quality: COD concentration is 50-100 mg/L, TN concentration is 25-30 mg L, pH is 7.4-7.6, ammonia nitrogen concentration is 3.0-4.2 mg/L, nitrite nitrogen concentration is 0.2-0.8 mg/L, sewage temperature is 16-18° C. The hydraulic retention time is 3.5 hours. The ceramsite is selected as the denitrification biofilter tank filter material and operated in a downward flow mode. The heterotrophic denitrification treatment is selected, and the implementation process comprises the following steps:

S1, pretreatment of ceramsite filter material: the ceramsite is placed in a 5% CMC solution and stirred for 5 minutes, then removed, naturally dried and filled into a denitrification biofilter tank;

S2, continuous operation after inoculation: activated sludge taken from the anoxic tank sludge (MLSS concentration of 3500 mg/L) from the municipal sewage treatment plant is added to the denitrification biofilter tank to submerge the filter material, all the sludge was discharged after 24 hours of air exposure without sewage inlet then normal sewage treatment is started, and 100 mg/L of rhamnolipid is added daily in the influent water, and the operation is continued. Wherein the rhamnolipid is a mixture of a mono-rhamnolipid and a di-rhamnolipid in a weight ratio of 1:1.3.

Figure 4:
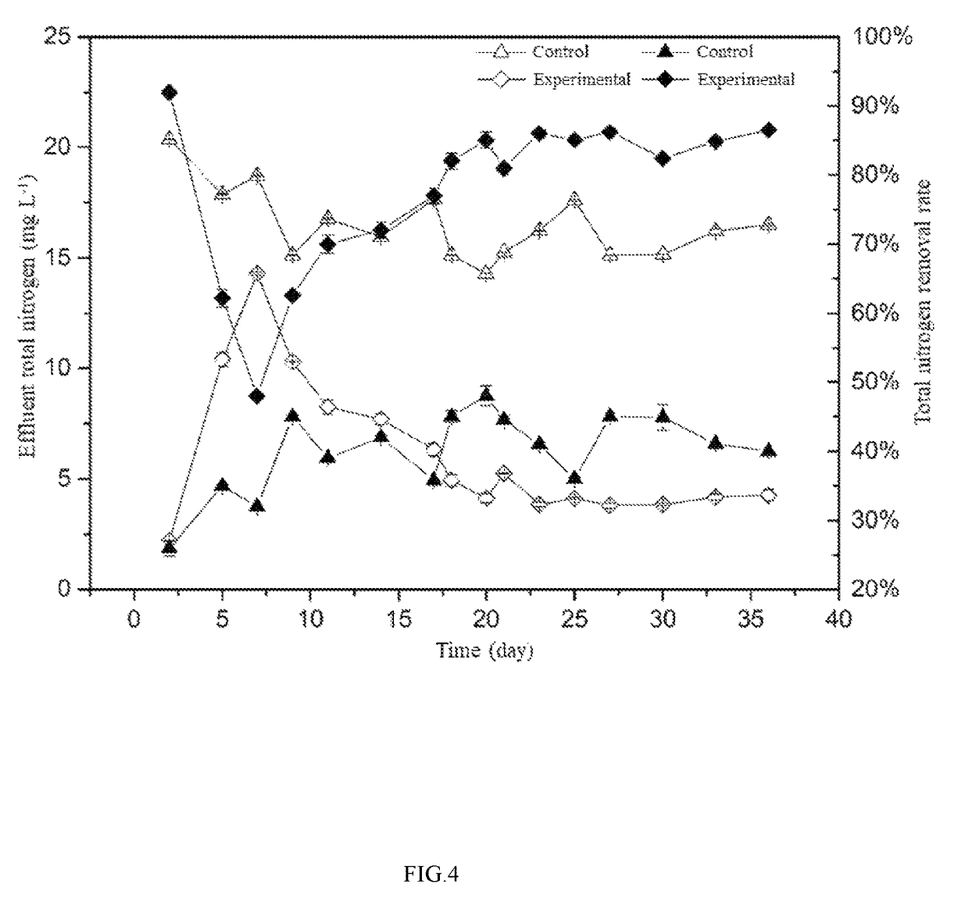
FIG. 4 is a diagram of the effect of the startup operation of the denitrification biofilter tank on the treatment of the micro-polluted surface water at normal temperature by the present method for promoting heterotrophic denitrification.

The total nitrogen in the effluent during operation is shown in FIG. 4. When the biofilter tank starts to operate, the CMC attached to the surface of the filter material can provide a carbon source for biological denitrification, so the total nitrogen removal rate is higher, and then due to the consumption of CMC, the total nitrogen removal rate decreased, and the removal rate gradually increased and reached a steady state due to the growth of the biofilm. After 18 days of operation of the denitrification biofilter tank started by this method, the removal rate of COD and total nitrogen reached 94% and 86%, respectively, and the subsequent effluent was substantially stable. A brownish yellow biofilm appeared on the surface of the filter material. The filter material at the same position of the filter tank is collected to determine the dry weight of the surface biofilm. After treatment with this method, the surface biomass of the filter material per unit mass increases by about 80%. At this time, it is considered that the process for starting the denitrification biofilter tank is completed and addition of rhamnolipid stops. And sewage is introduced normally. After the treatment by the present method, the startup time is shortened by 11 days compared with the denitrification biofilter tank in which the present technical case is not implemented, and the average removal rates of effluent COD and total nitrogen increases by about 6% and 40%, respectively, which shows the present implementation can speed up the startup of the denitrification biofilter tank and increase the ability to remove contaminants.

Example 4

This example relates to a method for rapidly starting the denitrification biofilter tank on the treatment of biochemical effluent of a municipal sewage at normal temperature by using a mixotrophic denitrification method.

Sewage quality: COD concentration 35-55 mg/L, TN concentration 16-20 mg/L, pH 7.0-7.4, ammonia nitrogen concentration 1-1.6 mg/L, nitrite nitrogen concentration 0.1-0.5 mg/L, sewage temperature is 15-18° C. The hydraulic retention time is set to 2 hours. The quartz sand is selected as the denitrification biofilter tank filter material and is operated in a downward flow mode. The mixotrophic denitrification method is selected and the implementation process comprises the following steps:

S1, after the filter material is filled into denitrification biofilter tank, the activated sludge taken from the anoxic tank sludge (MLSS concentration of 3500 mg/L) from the municipal sewage treatment plant is added thereto to submerge the filter material, all the sludge was discharged after 18 hours of air exposure without sewage inlet then normal sewage treatment is started, and 30 mg/L of rhamnolipid is added daily in the influent sewage, and the operation is continued. Wherein the rhamnolipid is a mixture of a mono-rhamnolipid and a di-rhamnolipid in a weight ratio of 1:1.5.

S2, after 14 days of continuous operation, the total nitrogen removal rate of the filter tank reaches over 60%. After collecting the filter material, microscopic examination is performed on the microscope. It is found that there is obvious bacterial micelle structure in the biofilm on the surface of the filter material. At this time, the addition of rhamnolipid is stopped, the total nitrogen in the effluent is determined to be between 8 and 10 mg/L. 40 mg/L of elemental sulfur powder is added daily according to the ratio of elemental sulfur:total nitrogen of 4:1, and the autotrophic microorganisms are domesticated and sewage is introduced normally.

Figure 5:
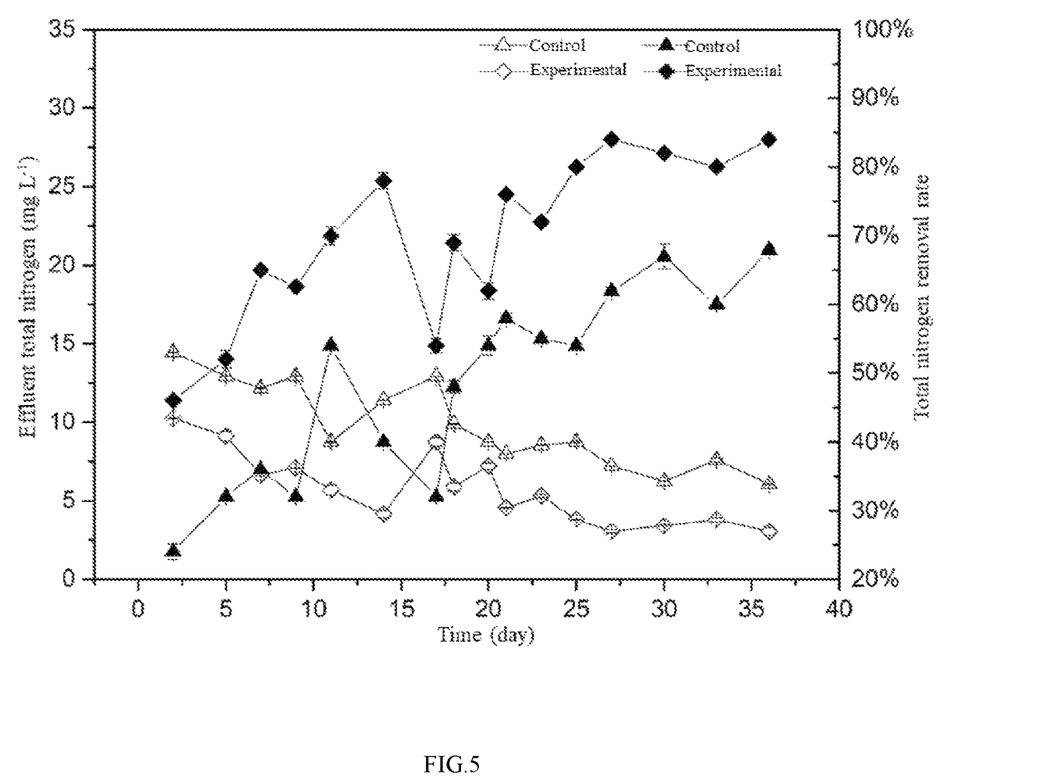
FIG. 5 is a diagram of the effect of the startup operation of the denitrification biofilter tank on the treatment of biochemical effluent of a municipal sewage at room temperature by the present method for promoting mixotrophic denitrification.

The total nitrogen in the effluent during operation is shown in FIG. 5. The growth of the biofilm is promoted by adding rhamnolipid in the first 14 days. On the 15th day, the addition of rhamnolipid is stopped and changed to sulfur powder. The abundance of autotrophic denitrifying microorganisms in the tank is low, so the total nitrogen removal rate began to increase gradually after a rapid decline. After 27 days of operation of the denitrification biofilter tank started by this method, the removal rate of COD and total nitrogen reached 85% and 81%, respectively, and the subsequent effluent was substantially stable. A yellowish biofilm appeared on the surface of the filter material. The filter material at the same position of the filter tank is collected to determine the dry weight of the surface biofilm. After treatment with this method, the surface biomass of the filter material per unit mass increases by about 65%. At this time, it is considered that the process for starting the denitrification biofilter tank is completed. For the control group, that is, the biofilter tank which is added with the sulfur powder but not rhamnolipid at the beginning of operation to domesticate, the total nitrogen removal rate has a slow rise and is relatively low. The startup time for the denitrification biofilter tank by the present method is shortened by 15 days compared with the denitrification biofilter tank in which the present technical case is not implemented, and the average removal rates of the effluent COD and total nitrogen increases by about 15% and 16%, respectively, which shows the present implementation can speed up the startup of the denitrification biofilter tank and increase the ability to remove contaminants.

Example 5

This example relates to a method for rapidly starting the denitrification biofilter tank on the treatment of biochemical effluent of a pharmaceutical industrial sewage at a low temperature by using a mixotrophic denitrification method.

Sewage quality: COD concentration 90-140 mg L, TN concentration 40-50 mg/L, pH 7.8-8.2, ammonia nitrogen concentration 3-5 mg/L, nitrite nitrogen concentration 0.3-0.8 mg L, sewage temperature is 10-12° C. The hydraulic retention time is set to 2.5 hours. The ceramsite is selected as the denitrification biofilter tank filter material and is operated by an upward flow mode, the mixotrophic denitrification method is selected and the implementation process comprises the following steps:

S1, after the filter material is filled into denitrification biofilter tank, the activated sludge taken from the anoxic tank sludge (MLSS concentration of 4200 mg/L) from the municipal sewage treatment plant is added thereto to submerge the filter material, all the sludge was discharged after 18 hours of air exposure without sewage inlet then normal sewage treatment is started, and 30 mg/L of rhamnolipid is added daily in the influent water, and the operation is continued. Wherein the rhamnolipid is a mixture of a mono-rhamnolipid and a di-rhamnolipid in a weight ratio of 1:1.8.

S2, after 16 days of continuous operation, the total nitrogen removal rate of the filter tank reaches over 60%. After collecting the filter material, microscopic examination is performed on the microscope. It is found that there is obvious bacterial micelle structure in the biofilm on the surface of the filter material. At this time, the addition of rhamnolipid is stopped, the total nitrogen in the effluent is determined to be between 22 and 26 mg/L. 120 mg/L of sodium sulfide is added daily according to the ratio of sodium sulfide:total nitrogen of 5:1, and the autotrophic microorganisms are domesticated and sewage is introduced normally.

Figure 6:
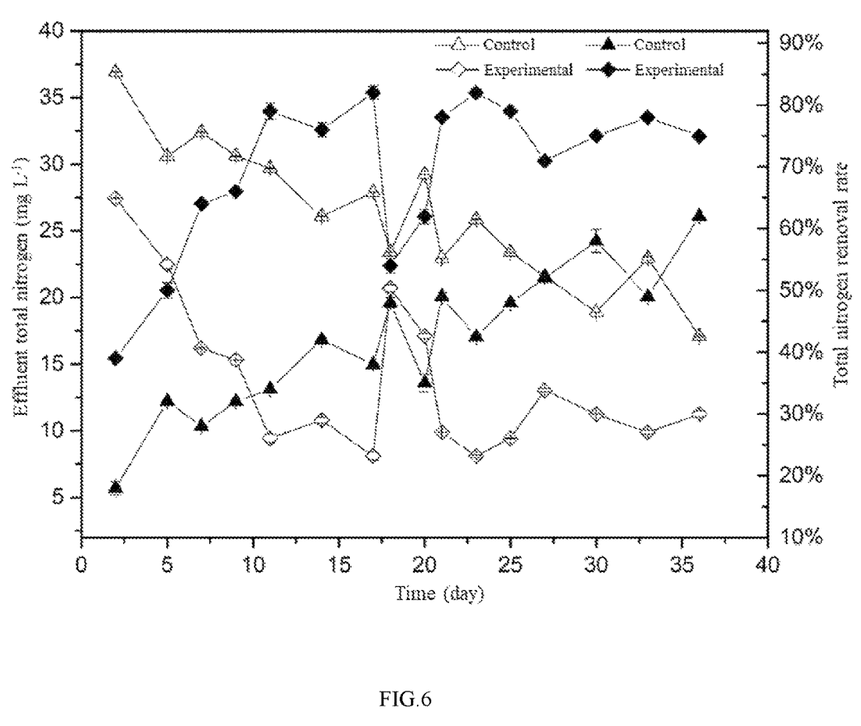
FIG. 6 is a diagram of the effect of the startup operation of the denitrification biofilter tank on the treatment of biochemical effluent of a pharmaceutical industry sewage by the present method for promoting mixotrophic denitrification.

The total nitrogen in the effluent during operation is shown in FIG. 6. The growth of the biofilm is promoted by adding rhamnolipid in the first 16 days. On the 17th day, the addition of rhamnolipid is stopped and changed to sodium sulfide. The abundance of autotrophic denitrifying microorganisms in the tank is low, so the total nitrogen removal rate began to increase gradually after a rapid decline. After 30 days of operation of the denitrification biofilter tank started by this method, the removal rate of COD and total nitrogen reached 85% and 76%, respectively, and the subsequent effluent was substantially stable. A yellowish biofilm appeared on the surface of the filter material. The filter material at the same position of the filter tank is collected to determine the dry weight of the surface biofilm. After treatment with this method, the surface biomass of the filter material per unit mass increases by about 105%. At this time, it is considered that the process for starting the denitrification biofilter tank is completed. For the control group, that is, the biofilter tank which is added with sodium sulfide but not rhamnolipid at the beginning of operation to domesticate, the total nitrogen removal rate has a slow rise and is relatively low. The startup time for the denitrification biofilter tank by the present method is shortened by 18 days compared with the denitrification biofilter tank in which the present technical case is not implemented, and the average removal rates of total nitrogen increases by about 16%, which shows the present implementation can speed up the startup of the denitrification biofilter tank and increase the ability to remove contaminants.

Example 6

This example relates to a method for rapidly starting the denitrification biofilter tank on the treatment of a micro-polluted surface water normal temperature by using a mixotrophic denitrification method.

Sewage quality: COD concentration 20-35 mg/L, TN concentration 14-18 mg/L, pH 7.1-7.2, ammonia nitrogen concentration 0.2-0.4 mg/L, nitrite nitrogen concentration 0.03-0.12 mg/L, sewage temperature is 16-19° C. The hydraulic retention time is set to 3.5 hours. The ceramsite is selected as the denitrification biofilter tank filter material and is operated by a downward flow mode, the mixotrophic denitrification method is selected and the implementation process comprises the following steps:

S1, after the filter material is filled into denitrification biofilter tank, the activated sludge taken from the anoxic tank sludge (MLSS concentration of 3900 mg/L) from the municipal sewage treatment plant is added thereto to submerge the filter material, all the sludge was discharged after 12 hours of air exposure without sewage inlet then normal sewage treatment is started, and 40 mg/L of rhamnolipid is added daily in the influent water, and the operation is continued. Wherein the rhamnolipid is a mixture of a mono-rhamnolipid and a di-rhamnolipid in a weight ratio of 1:2.

S2, after 18 days of continuous operation, the total nitrogen removal rate of the filter tank reaches over 60%. After collecting the filter material, microscopic examination is performed on the microscope. It is found that there is obvious bacterial micelle structure in the biofilm on the surface of the filter material. At this time, the addition of rhamnolipid is stopped, the total nitrogen in the effluent is determined to be between 7 and 10 mg/L. 90 mg/L of sodium thiosulfate is added daily according to the ratio of sodium thiosulfate:total nitrogen of 10:1, and the autotrophic microorganisms are domesticated and sewage is introduced normally.

Figure 7:
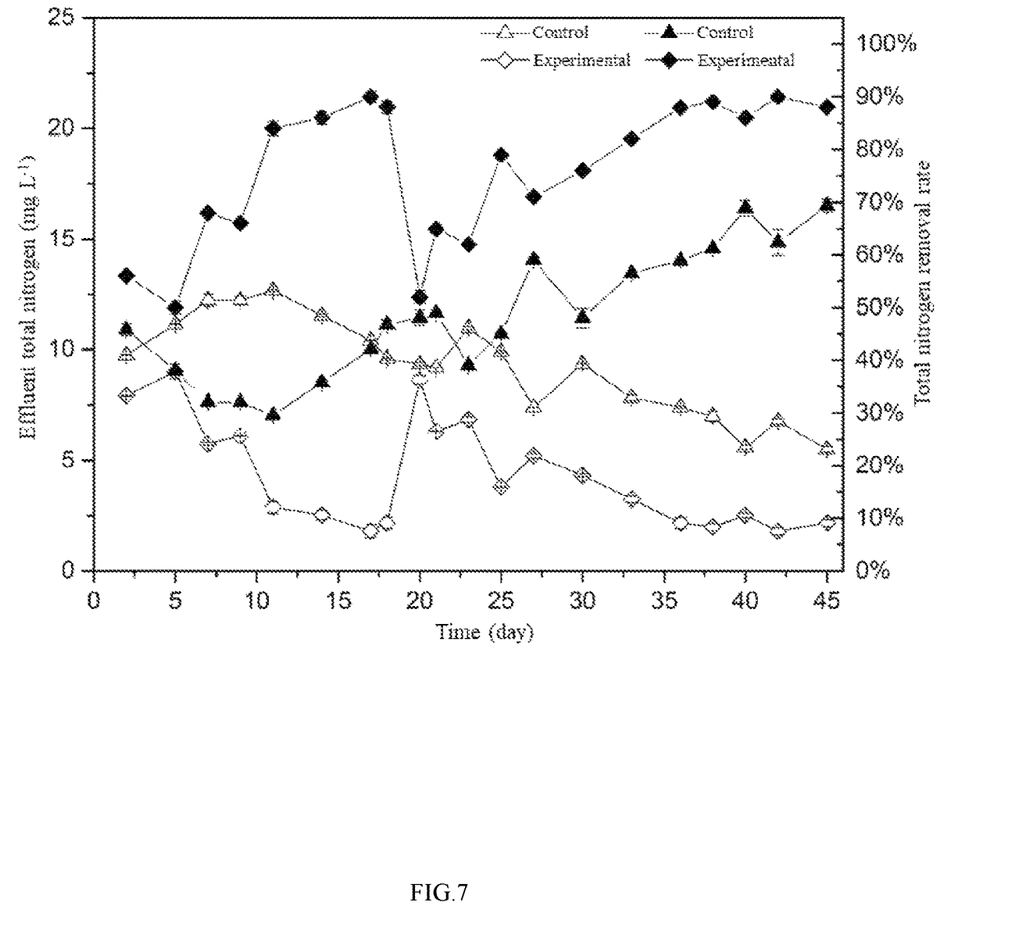
FIG. 7 is a diagram of the effect of the startup operation of the denitrification biofilter tank on the treatment of the micro-polluted surface water at normal temperature by the present method for promoting mixotrophic denitrification.

The total nitrogen in the effluent during operation is shown in FIG. 7. The growth of the biofilm is promoted by adding rhamnolipid in the first 18 days. On the 19th day, the addition of rhamnolipid is stopped and changed to sodium thiosulfate. The abundance of autotrophic denitrifying microorganisms in the tank is low, so the total nitrogen removal rate began to increase gradually after a rapid decline. After 36 days of operation of the denitrification biofilter tank started by this method, the removal rates of total nitrogen reached 90%, and the subsequent effluent was substantially stable. A yellowish biofilm appeared on the surface of the filter material, the surface biomass of the filter material per unit mass increases by about 85%, it is considered that the process for starting the denitrification biofilter tank is completed. For the control group, that is, the biofilter tank which is added with sodium thiosulfate but not rhamnolipid at the beginning of operation to domesticate, the total nitrogen removal rate has a slow rise and is relatively low. The startup time for the denitrification biofilter tank by the present method is shortened by 14 days compared with the denitrification biofilter tank in which the present technical case is not implemented, and the average removal rates of total nitrogen increases by about 20%, which shows the present implementation can speed up the startup of the denitrification biofilter tank and increase the ability to remove contaminants.

It should be understood that those skilled in the art will recognize that some variations that can be directly derived or associated from the disclosure of the present invention and common knowledge under the motivation from the concept of the invention and its particular examples, those skilled in the art will recognize that. Other methods, or alternatives to well-known techniques commonly used in the prior art, and insubstantial modifications of different combinations of features, etc., can be applied as well, and the functions and effects described in the present invention can be implemented, and examples will not be explained in detail but is within the scope of the present invention.

We claim:
1. A method for achieving startup of a denitrification biofilter tank, comprising the following steps:
S1, selecting a denitrification method: selecting heterotrophic denitrification method or heterotrophic-sulfur autotrophic denitrification method for treatment;
S2. if the heterotrophic denitrification method is selected to treat the sewage, conducting pretreatment to the biosupportive media of a biofilter with sodium carboxymethyl cellulose (CMC) solution, and then filling into the filter tank, inoculating activated sludge and then introducing sewage, and daily adding 50-200 mg/L rhamnolipid into the sewage;

S3. if the heterotrophic-sulfur autotrophic denitrification method is selected to treat the sewage, first inoculating the activated sludge and introducing sewage, and daily adding 30-100 mg/L rhamnolipid into the sewage, and the addition is stopped after a period of continuous operation, calculating the amount of total nitrogen needed to be removed by autotrophic denitrification according to the total nitrogen in the effluent and effluent discharge standards after stopping the addition of rhamnolipid, and adding sulfur source according to the ratio of different sulfur sources and total nitrogen required to be removed, growing the denitrifying microorganisms;

S4. continuously operating the biofilter tank until the denitrification biofilter tank starts.

2. The method according to claim 1, wherein the type of sewage in S1 is any one of municipal sewage, biochemical effluent of industrial sewage or micro-polluted surface water and the applicable sewage temperature range is 8-25° C.

3. The method according to claim 1, wherein the specific method for pretreating the biosupportive media of the biofilter using the CMC solution in S2 is: placing the biosupportive media of the biofilter in a CMC solution having a mass concentration of 2% to 5% and stirring 2-5 minutes, removing and naturally air drying for use.

4. The method according to claim 1, wherein the rhamnolipid in S2 and S3 is a mixture of mono-rhamnolipid and di-rhamnolipid, the weight ratio of the two is 1:1~1:2, the purity is industrial grade, and the concentration is 25%.

5. The method of claim 1 wherein the biosupportive media of the biofilter in S2 and S3 is one selected from the group consisting of ceramsite, quartz sand or volcanic rock.

6. The method according to claim 1, wherein the dosage of rhamnolipid in S2 is 50-200 mg/L, the dosage is daily, and the dosage of rhamnolipid in S3 is 30-100 mg/L, and the dosage is daily.

7. The method according to claim 1, wherein after adding the rhamnolipid in S4 and the total nitrogen removal rate is over 60%, the biosupportive media of the biofilter is collected and examined by microscope, wherein when bacterial micelle structure is detected, a sulfur source is added in S4, wherein the sulfur source is any one of elemental sulfur, sodium sulfide or sodium thiosulfate, wherein the amount of the sulfur source needed is determined by firstly calculating the amount of total nitrogen needed to be removed by autotrophic denitrification according to the total nitrogen in the effluent and effluent discharge standards after stopping the addition of rhamnolipid, and then calculating the amount of sulfur source according to the following sulfur source/total nitrogen ratio: 3-5 kg of elemental sulfur/ kg·TN, 5-6 kg of sodium sulfide/kg·TN, 8-10 kg of sodium thiosulfate/kg·TN, the dosage is added daily.

* * * * *